US010671802B2

(12) United States Patent
Galante et al.

(10) Patent No.: US 10,671,802 B2
(45) Date of Patent: Jun. 2, 2020

(54) TIERED VARIABLES FOR A GRAPHICAL USER INTERFACE

(71) Applicant: Red Hat, Inc., Raleigh, NC (US)

(72) Inventors: Andres Galante, Caba (AR); Clifton Walter Pyles, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/043,711

(22) Filed: Jul. 24, 2018

(65) Prior Publication Data
US 2020/0034410 A1    Jan. 30, 2020

(51) Int. Cl.
*G06F 16/00* (2019.01)
*G06F 40/154* (2020.01)
*H04L 29/06* (2006.01)
*G06F 16/958* (2019.01)

(52) U.S. Cl.
CPC .......... *G06F 40/154* (2020.01); *G06F 16/986* (2019.01); *H04L 67/42* (2013.01)

(58) Field of Classification Search
CPC ....... G06F 17/227; G06F 16/986; H04L 67/42
See application file for complete search history.

(56) References Cited

U.S. PATENT DOCUMENTS

| | | | | |
|---|---|---|---|---|
| 6,477,580 B1* | 11/2002 | Bowman-Amuah | ..... | G06F 9/54 709/231 |
| 7,096,465 B1* | 8/2006 | Dardinski | .......... | G05B 19/0426 717/121 |
| 7,516,122 B2* | 4/2009 | Paval | ........................ | G06F 8/71 |
| 9,626,080 B1* | 4/2017 | Labaj | ........................ | G06F 3/00 |
| 2002/0049788 A1* | 4/2002 | Lipkin | .................. | G06F 16/972 715/236 |
| 2003/0033535 A1* | 2/2003 | Fisher | ..................... | G06F 9/468 713/185 |
| 2004/0205473 A1* | 10/2004 | Fisher | ..................... | G06F 21/41 715/255 |

(Continued)

FOREIGN PATENT DOCUMENTS

WO    2016/013942 A3    11/2018

OTHER PUBLICATIONS

"Locally Scoped CSS Variables: What, How and Why", Jun. 5, 2017, https://una.im/local-css-vars/, pp. 1-8. (Year: 2017).*

(Continued)

*Primary Examiner* — Laurie A Ries
(74) *Attorney, Agent, or Firm* — Kilpatrick Townsend & Stockton LLP

(57) ABSTRACT

A processing device in a system can receive a definition and an assigned value for a global variable for an on-line document such as an HTML document, and a definition of a component variable associated with a component of the on-line document. The component variable is defined so as to acquire a globally specified value, such as the value of a globally specified variable. The definition of the global variable and the definition of the component variable are stored in an aesthetic descriptor file such as a cascading style sheet configured to refer to the assigned value for the global variable and the globally specified value for the component variable when rendering the on-line document. The descriptor file can then include two tiers of variables with values that are globally assigned, providing granular control to authors.

18 Claims, 7 Drawing Sheets

(56) References Cited

U.S. PATENT DOCUMENTS

| | | | |
|---|---|---|---|
| 2009/0083619 A1* | 3/2009 | Davis | G06F 16/9558 |
| | | | 715/234 |
| 2010/0251143 A1* | 9/2010 | Thomas | G06F 16/958 |
| | | | 715/760 |
| 2012/0078968 A1* | 3/2012 | Nixon | G06F 16/14 |
| | | | 707/792 |
| 2014/0281850 A1* | 9/2014 | Prakash | G06F 17/218 |
| | | | 715/202 |
| 2015/0082208 A1* | 3/2015 | Klinger | G06F 3/04847 |
| | | | 715/762 |
| 2016/0103563 A1* | 4/2016 | Greenberg | G06F 3/0482 |
| | | | 715/738 |
| 2017/0161035 A1* | 6/2017 | Abadi | G06F 8/443 |
| 2018/0024814 A1* | 1/2018 | Ouali | G06F 8/10 |
| | | | 717/105 |
| 2018/0239507 A1* | 8/2018 | Bui | G06Q 10/103 |
| 2019/0222619 A1* | 7/2019 | Shribman | H04L 65/4084 |

OTHER PUBLICATIONS

Galante, A., "Theming with Variables: Globals and Locals," Mar. 16, 2018, https://css-tricks.com/theming-with-variables-globals-and locals/.

Emmanuel, O., "Everything You Need to Know About CSS Variables," Feb. 12, 2018, https://medium.freecodecamp.org/everthing-you-need-to-know-about-css-variables-c74d922ea855.

Okonetchnikov, A., "CSS-in-JS—The good or the evil?," UI Engineer @ Feedly, 2017, https://2017.pitercss.com/slides/css-in-js.pdf.

"Locally Scoped CSS Variables: What, How, and Why," Jun. 5, 2017, https://una.im/local-css-vars/.

\* cited by examiner

500

```
:root {
/* --global--concept--size */
--global--spacer--sm: .5rem;
--global--spacer--md: 1rem;
--global--spacer--lg: 2rem;

/* --global--concept--PropertyCamelCase */
--global--main-title--FontSize: 2rem;
--global--secondary-title--FontSize: 1.8rem;
--global--body--FontSize: 1rem;

/* --global--state--PropertyCamelCase */
--global--hover--BackgroundColor: #ccc;
}
```

600

```
/* Component scoped variables are always defined by global variables */
.alert {
--alert--Padding: var(--global--spacer--md);
--alert--primary--BackgroundColor: var(--global--primary-color);
--alert__title--FontSize: var(--global--secondary-title--FontSize);

/* --block--PropertyCamelCase */
padding: var(--alert--Padding, 1rem); /* Sets the fallback to 1rem. */
}
/* --block--state--PropertyCamelCase */
.alert--primary {
background-color: var(--alert--primary--BackgroundColor, #ccc);
}
/* --block__element--PropertyCamelCase */
.alert__title {
font-size: var(--alert__title--FontSize, 1.8rem);
}
```

```
:root {
/* changes the secondary title size across the system */
--global--secondary-title--FontSize: 2rem;

/* changes the padding on the alert only */
--alert--Padding: 3rem;
}
*
```

TIERED VARIABLES FOR A GRAPHICAL USER INTERFACE

TECHNICAL FIELD

The present disclosure relates generally to graphical user interfaces. More specifically, but not by way of limitation, this disclosure relates variable definitions and variable value assignment as used for presentation of on-line documents that follow known descriptors such as those that are contained in a cascading style sheet.

BACKGROUND

A cascading style sheet (CSS) is a file that includes descriptors that define hypertext markup language (HTML) properties to control the aesthetics of various elements such as buttons, backgrounds, and navigation controls for an HTML document. A CSS can include variable definitions and the variables can be given desired values by an author or designer to achieve a desired aesthetic. A global variable is used throughout the document. A scoped variable is used only within a component or components of the document and is thus limited in scope. A scoped variable can also be referred to as a component variable. Changes to global variables in a CSS can be made in order to change the appearance of the document as a whole. Component variables are defined at the component level.

BRIEF DESCRIPTION OF THE DRAWINGS

FIG. 6 is an example of computer program code used in a two-tiered variable system for a GUI according to some aspects.

DETAILED DESCRIPTION

Figure 1:
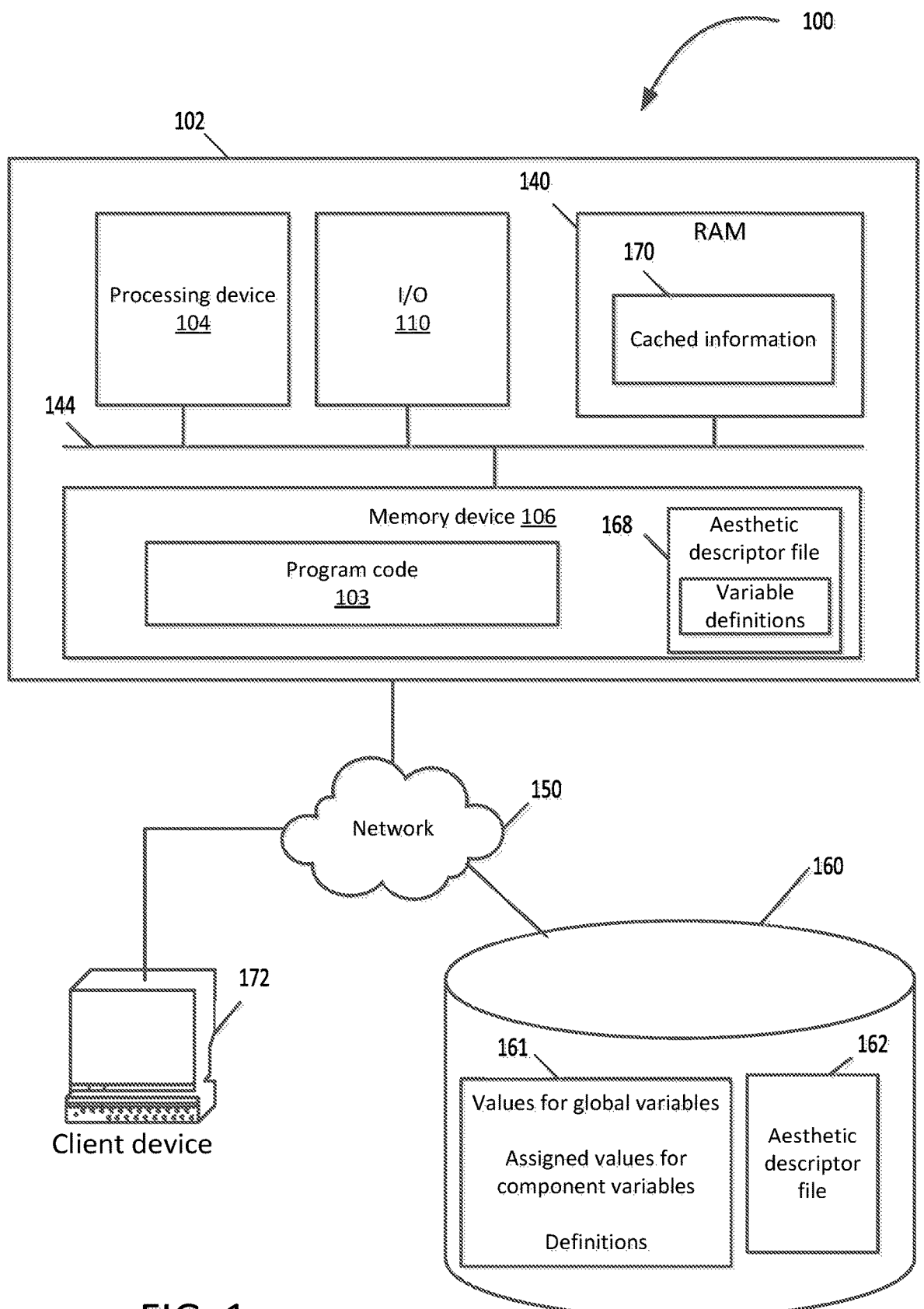
FIG. 1 is a block diagram of an example of a system that uses aesthetic descriptor files to present a graphical user interface (GUI) according to some aspects.

It can be difficult for a developer to set and manage variables in an aesthetic descriptor file such as a CSS file to create a useful and attractive design, while maintaining consistency and the ability to make changes quickly when necessary. A typical on-line document includes multiple components. If too many variables are scoped to specific components, the design will lose consistency. If too many variables are global, the design will lose granularity. Relying on variables scoped to individual components can also result in a design that is time consuming and error prone to change, since such a scoped variable must be changed within each component that uses it.

Some examples of the present disclosure overcome one or more of the abovementioned issues by providing two tiers of variables that can all take on values that are globally assigned. A first tier of variables includes global variables. A second tier of variables includes scoped, or component variables, that is, variables that are specific to individual components of an on-line document. A component variable in this example has a value that is specified globally. For example, the component variable can have a value that is set to be the same value as a value assigned to a global variable. A component variable according to certain aspects of the disclosure is not designed to have its value set from within a component, but externally, although a default value can be set within the component for situations where a global value is not available.

As an example, a processing device in a system can receive, as input, a definition and an assigned value for at least one global variable specifying an aesthetic for an on-line document such as an HTML document, and receive, as input, a definition of at least one component variable associated with an aesthetic property of a component of the on-line document. The component variable can be defined so as to acquire a globally specified value that can also be specified by receiving input, and can be set to be the same value as one of the global variables defined in the system. The definition of the global variable and the definition of the component variable can be stored in an aesthetic descriptor file such as a cascading style sheet file configured to refer to the assigned value for the global variable and the globally specified value for the component variable when rendering the on-line document. There can be multiple variables in each tier of variables. When requested, the on-line document can be rendered by referring to the aesthetic descriptor file including the assigned value for the global variable and the globally specified value for the component variable.

Some examples of the present disclosure maintain consistency while also providing the ability to make changes quickly when necessary. In some examples, a processing device can receive a new globally specified value for a component variable, and from that point forward can render the on-line document so that all of the components with component variables that have the same globally specified value reflect the new globally specified value. When a component variable value is set to be the same as the value of one of the global variables defined in the system, the change to the global variable value is also a change to the globally specified value for the component variable.

In some examples, in addition to receiving global variable values or other values that can be imparted to component variables, the processor can receive a default value for the component variable. The default value is specified at the component level. This default value can be imparted to a component variable if a globally specified value is unavailable due to some coding error or for any other reason.

In some examples, the tiered arrangement according to certain aspects provides for consistency across components, and provides a common language that can be used between authors and developers. The arrangement concurrently provides granular control to authors and allows a document to be themed without having to overwrite style sheets, reducing the risk of introducing errors, resulting in a more easily maintainable system.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a system 100 that uses two tiers of variables for a GUI according to some aspects. More specifically, the system 100 includes a computing device 102. Examples of the computing device 102 can include a server, laptop computer, desktop computer, or any combination of these. The computing device 102 can execute computer program code instructions, which can be software for editing aesthetic descriptor files such as CSS files and defining two tiers of variables within the aesthetic descriptor files. Software can include computer-readable instructions that are executable by a processing device 104, such as program code instructions 103. The system can be programmed in any suitable programming language, such as Java, C++, C, Python, or any combination of these.

In FIG. 1, computing device 102 includes a processing device 104, memory device 106, an input/output (I/O) module or modules 110, and a random access memory (RAM) 140. A bus or interconnect 144 is also provided to allow for inter- and intra-device communications using, for example, I/O module 110. I/O module 110 can include a network interface (not shown), which in turn communicates with network 150. Processing device 104 can include one processing device or multiple processing devices. The processing device 104 can execute one or more operations defining and assigning values to global variables and component variables being used in an aesthetic descriptor file such as a CSS file.

Non-limiting examples of the memory device 106 include electrically erasable and programmable read-only memory (EEPROM), flash memory, or any other type of non-volatile memory. In some examples, at least some of the memory device can include a non-transitory computer-readable medium from which the processing device 104 can read program code instructions 103. A computer-readable medium can include electronic, optical, magnetic, or other storage devices capable of providing the processing device with computer-readable instructions or other files. Non-limiting examples of a computer-readable medium include magnetic disk(s), memory chip(s), ROM, random-access memory (RAM), an ASIC, a configured processor, optical storage, or any other medium from which a computer processor can read instructions.

Still referring to FIG. 1, network 150 connects computing device 102 to storage device 160. In the example of FIG. 1, storage device 160 is a non-transitory, computer-readable, storage medium that includes variable information 161 with values and definitions for global variables and component variables and aesthetic descriptor file 162. Storage device 160 can also be used to store computer program code. The aesthetic descriptor files include variable definitions for both global variables and component variables. In this particular example, at least aesthetic descriptor file 168 with variable definitions is also incorporated in the file system of memory device 106. In the example of FIG. 1, cached documents, variable values, aesthetic descriptor files, or other information 170 may be stored in RAM 140. Network 150 also connects computing device 102 to client device 172, which may be a personal computer, smartphone, tablet computer, or some other type of client device. On-line documents can be rendered in a Web browser of the client device in response to a request from client device 172, and these on-line documents can be rendered according to an aesthetic descriptor file making use of global and component variables as described herein.

Figure 2:
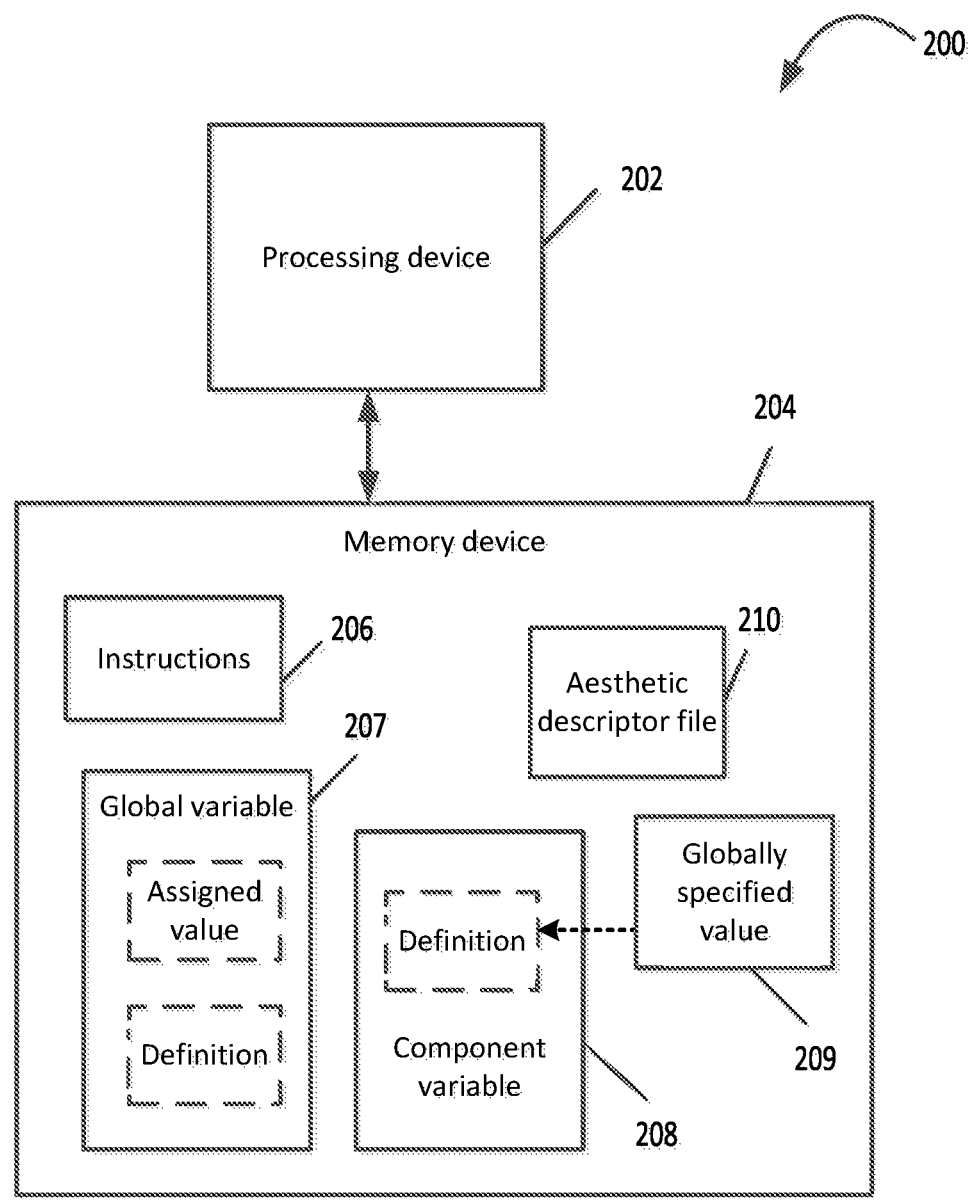
FIG. 2 is a block diagram of another example system that uses aesthetic descriptor files to present a graphical user interface (GUI) according to some aspects.

FIG. 2 is a block diagram of an example system 200 that uses two tiers of variables for a graphical user interface (GUI). The system 200 includes a processing device 202 that can execute computer program code, also referred to as instructions or program code instructions, for performing operations related to using two tiers of variables, one tier of global variables and another tier of component variables that are assigned values based on global variables. Processing device 202 is communicatively coupled to a memory device 204. The processing device 202 can include one processing device or multiple processing devices. Non-limiting examples of the processing device 202 include a field-programmable gate array (FPGA), an application-specific integrated circuit (ASIC), a microprocessor, etc. The processing device 202 can execute one or more operations for defining and setting variables according to user input. The processing device 202 can execute program code instructions 206 stored in the memory device 204 to perform the operations.

Memory device 204 can include one memory device or multiple memory devices. The memory device 204 can be non-volatile and may include any type of memory device that retains stored information when powered off. In some examples, at least some of the memory device can include a non-transitory computer-readable medium from which the processing device 202 can read instructions 206. A computer-readable medium can include electronic, optical, magnetic, or other storage devices capable of providing the processing device with computer-readable instructions 206 or other program code.

The memory device 204 can also include one or more files. For example, memory device 204 can serve as a storage device for one or more global variables 207, including assigned values and definitions. Memory device 204 can also serve as a storage device for one or more component variables 208, including a definition, which may take on globally assigned value 209. One or more aesthetic descriptor files 210 can also be stored locally in memory device 204. An aesthetic descriptor file 210 is in some aspects a CSS files, a type of aesthetic descriptor file. Although FIGS. 1 and 2 depict a certain arrangement of components for illustrative purposes, other examples can include any number and combination of these components arranged in any suitable configuration.

Figure 3:
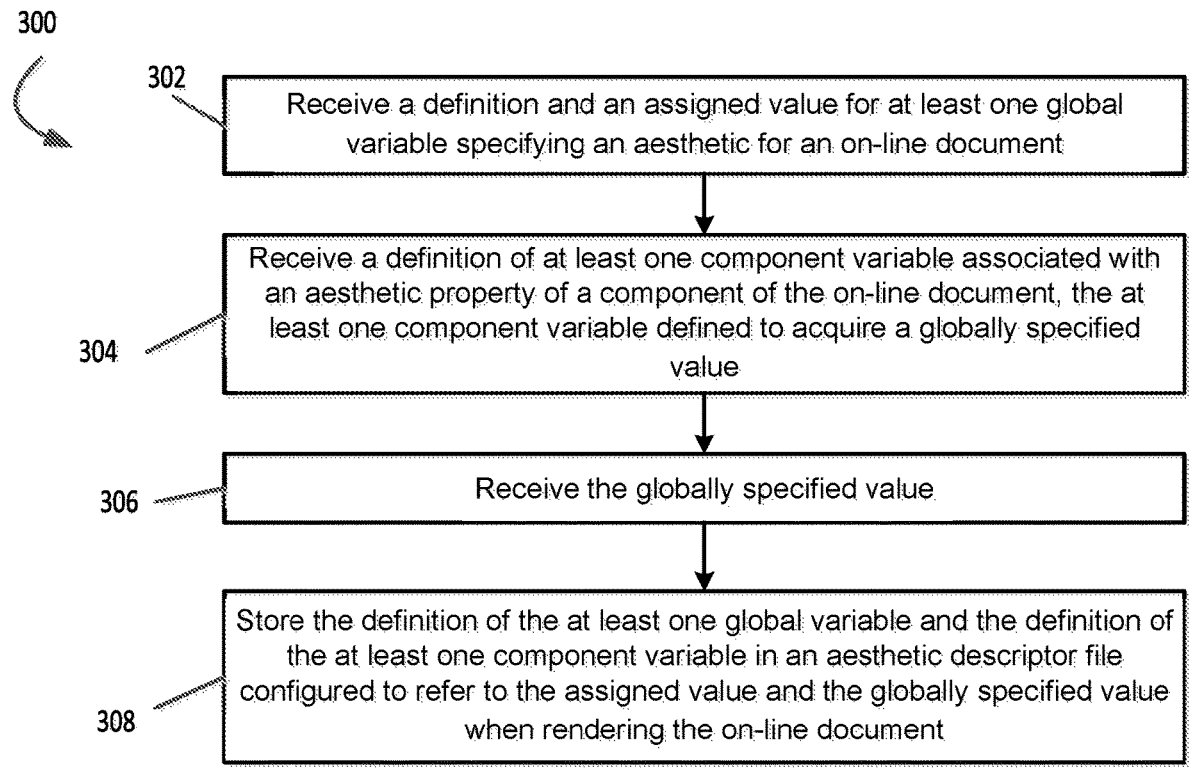
FIG. 3 is a flowchart of an example process for establishing and using a two-tiered variable system for a GUI according to some aspects.

In some examples, a processing device (e.g., processing device 104 or processing device 202) can perform one or more of the operations shown in FIG. 3 to establish a two-tiered variable system. In other examples, the computing device can implement more operations, fewer operations, different operations, or a different order of the operations depicted in FIG. 3. Process 300 of FIG. 3 is described below with reference to components discussed above.

In block 302 of FIG. 3, processing device 104 or 202 receives a definition and an assigned value for at least one global variable specifying an aesthetic for an on-line document. In block 304, processing device 104 or 202 receives a definition of at least one component variable associated with an aesthetic property of a component of the HTML document where the component variable can be assigned a globally specified value. In block 306, processing device 104 or 202 receives the globally specified value. There can be various ways of specifying this value. In this example, the value for a component variable is specified by having the component variable take on the value of a global variable. The inputs described above can be received via I/O module 110 and through network 150. In block 308 of FIG. 4, the definitions of global variables and the definitions of component variables are stored in the aesthetic descriptor file configured to refer to the assigned value for a global variable as the globally specified value for a component when rendering the on-line document. The aesthetic descriptor file and variable values can be stored, as examples, in memory device 106, memory device 204, or storage medium 160.

Figure 4:
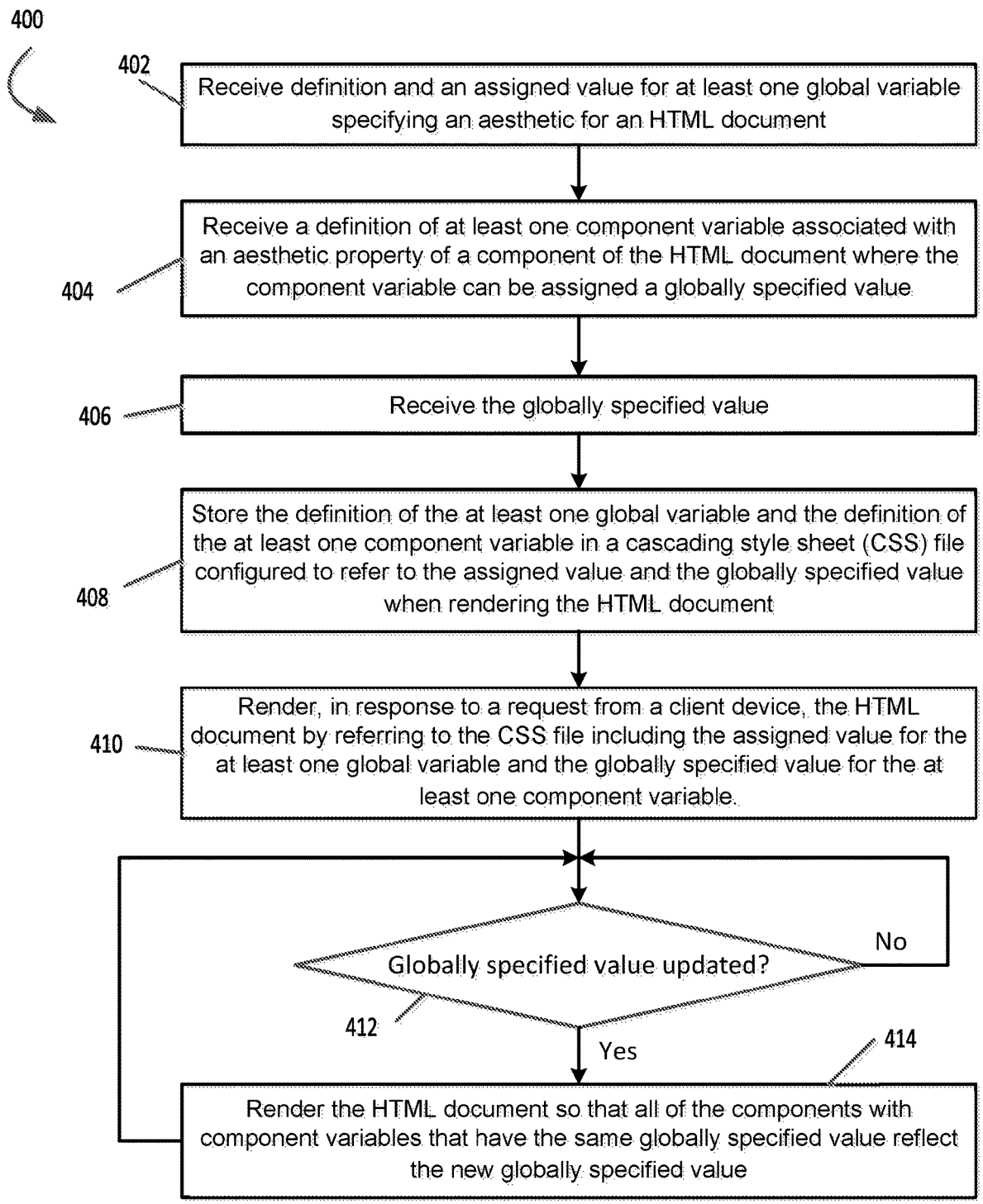
FIG. 4 is a flowchart of another example process for establishing and using a two-tiered variable system for a GUI according to some aspects.

As another example, a computing device such as processing device 104 or 202 can perform the operations 400 of FIG. 4 to establish a two-tiered variable system. In block 402 of FIG. 4, the processing device receives a definition and an assigned value for at least one global variable specifying an aesthetic for an HTML document. In block 404, the processing device receives a definition of at least one component variable associated with an aesthetic property of a component of the HTML document where the component variable can be assigned a globally specified value. In block 406, the processing device receives the globally specified value. There can be various ways of specifying this value. In this example, value is specified by having the component variable take on the value of a global variable.

Still referring to FIG. 4, in block 408, the definitions of global variables and the definitions of component variables are stored in a CSS file configured to refer to the assigned value for a global variable as the globally specified value for a component when rendering the HTML document. At block 410, the processing device renders the HTML document by referring to the CSS file including the assigned values for the global variables and the globally specified values for the component variables. As an example, the HTML document can be rendered on a client device in a Web browser in response to a request from client device. If a globally specified value for a component variable is changed at block 412, stored information and style sheets are updated to reflect the new value, including all components that use the globally specified value, for example, all components with a variable that refers to a global variable value that is changed. The processing device from then on renders the HTML document at block 414 so that all of the components with component variables that have the same globally specified value reflect the new globally specified value.

Figure 5:
FIG. 5 is an example of computer program code used in a two-tiered variable system for a GUI according to some aspects.
Figure 7:
FIG. 7 is an additional example of computer program code used in a two-tiered variable system for a GUI according to some aspects.

As a specific example of the process above, variables as used in CSS files are separated into at least two types as illustrated in FIGS. 5, 6, and 7. Global variables provide consistency across components. Component variables provide granularity and isolation between components. Aspects of the present disclosure use these two types together to provide a two-layer or two-tiered theming system where global variables inform component variables. Each one of the layers follow a set of very specific rules. Since global variables exist in one layer mainly to provide consistency throughout a document, they are identified as "global" and follow the formula, "--global--concept--modifier--state—'PropertyCamelCase'." Global variables also adhere to definitional rules where a "concept" is something like a "spacer" or a "main-title," a "state" is something like "hover" or "expanded," a "modifier" is something like "sm" or "lg," and a "PropertyCamelCase" is something like "BackgroundColor" or "FontSize." These concepts are not tied to an element or component. For example, the specifier "--global-h1-font-size" would be incorrect; the specifier "--global--main-title—FontSize" would be correct. FIG. 5 illustrates an example 500 from a CSS file that shows a global variable setup according to certain aspects.

Component variables according to some aspects exist in the other layer mainly to provide theme-able component properties, they follow the formula, "--block_element--modifier--state—'PropertyCamelCase'." Component variable also follow definitional rules where the "block_element—modifier" selector name is something like "alert_actions" or "alert—primary," a "state" is something like "hover" or "active," and if block_element modifier class names are used "block_element—modifier" is replaced with a user-defined "classname." In certain aspects, the value of a component or scoped variable is defined by a global variable and a component variable has a default value assigned as a fallback in case the component doesn't have access to values of global variables. FIG. 6 illustrates an example 600 from a CSS file that shows a component variable setup.

A system in which scoped variables are defined using global variables allows authors to theme and change the system as a whole. For example, if a user wishes to change the primary color across all components the user only needs to redefine the variable "--global--primary-color." Alternatively, each component variable can be assigned a default value so that a component can stand on its own if necessary; the component does not depend on anything and authors can define variables in isolation when necessary. This arrangement provides for consistency across components, provides a common language to use between authors and developers since authors and developers can set the same global variables as bumpers. This arrangement concurrently provides granular control to allow authors to easily theme a design without having to overwrite CSS files, reducing the risk of introducing errors, resulting in a more easily maintainable system. The two-tier theming system generates modular and isolated components where authors have the ability to customize components at a global and at a component level. FIG. 7 illustrates an example 700 from a CSS file that shows a these two levels of variables being specified together.

Unless specifically stated otherwise, it is appreciated that throughout this specification that terms such as "operations," "processing," "computing," and "determining" or the like refer to actions or processes of a computing device, such as one or more computers or a similar electronic computing device or devices, that manipulate or transform data represented as physical electronic or magnetic quantities within memories, or other information storage devices, transmission devices, or display devices of the computing platform. The order of the blocks presented in the examples above can be varied—for example, blocks can be re-ordered, combined, or broken into sub-blocks. Certain blocks or processes can be performed in parallel.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A system comprising:
a processing device; and
a memory device including instructions that are executable by the processing device for causing the processing device to perform operations comprising:
receiving a definition and an assigned value for at least one global variable specifying an aesthetic for an on-line document;
receiving a definition of at least one component variable associated with an aesthetic property of a component of the on-line document, the at least one component variable defined to acquire a globally specified value;

receiving the globally specified value;
receiving a default value for the at least one component variable;
storing the definition of the at least one global variable and the definition of the at least one component variable in an aesthetic descriptor file for the component of the on-line document, the aesthetic descriptor file configured to refer to the assigned value and the globally specified value when rendering the on-line document; and
storing the default value in the aesthetic descriptor file for the component of the on-line document so that the at least one component variable is definable independently of an availability of the globally specified value.

2. The system of claim 1 wherein the operations further comprise rendering the on-line document by referring to the aesthetic descriptor file including the assigned value for the at least one global variable and the globally specified value for the at least one component variable.

3. The system of claim 2 wherein the on-line document comprises multiple components, and wherein the operations further comprise:
receiving a new globally specified value; and
rendering the on-line document so that all of the components with component variables that have the globally specified value reflect the new globally specified value.

4. The system of claim 1 wherein the operations further comprise rendering the on-line document using the default value for the at least one component variable when the globally specified value is unavailable.

5. The system of claim 1 wherein the operations further comprise:
sending the on-line document to a client device in response to a request from the client device; and
rendering the on-line document in a web browser of the client device by referring to the aesthetic descriptor file, the assigned value for the at least one global variable and the globally specified value for the at least one component variable.

6. The system of claim 1 wherein the globally specified value for the at least one component variable is the assigned value for the at least one global variable.

7. A method comprising:
receiving, by a processing device, a definition and an assigned value for at least one global variable specifying an aesthetic for an on-line document;
receiving, by the processing device, a definition of at least one component variable associated with an aesthetic property of a component of the on-line document, the at least one component variable defined to acquire a globally specified value;
receiving, by the processing device, the globally specified value;
receiving, by the processing device, a default value for the at least one component variable;
storing, in a memory device, the definition of the at least one global variable and the definition of the at least one component variable in an aesthetic descriptor file for the component of the on-line document, the aesthetic descriptor file configured to refer to the assigned value and the globally specified value when rendering the on-line document; and
storing, in the memory device, the default value in the aesthetic descriptor file for the component of the on-line document so that the at least one component variable is definable independently of an availability of the globally specified value.

8. The method of claim 7 further comprising rendering the on-line document by referring to the aesthetic descriptor file including the assigned value for the at least one global variable and the globally specified value for the at least one component variable.

9. The method of claim 8 wherein the on-line document comprises multiple components, and wherein the method further comprises:
receiving a new globally specified value; and
rendering the on-line document so that all of the components with component variables that have the globally specified value reflect the new globally specified value.

10. The method of claim 7 further comprising rendering the on-line document using the default value for the at least one component variable when the globally specified value is unavailable.

11. The method of claim 7 further comprising:
sending the on-line document to a client device in response to a request from the client device; and
rendering the on-line document in a web browser of the client device by referring to the aesthetic descriptor file, the assigned value for the at least one global variable and the globally specified value for the at least one component variable.

12. The method of claim 7 wherein the globally specified value for the at least one component variable is the assigned value for the at least one global variable.

13. A non-transitory computer-readable medium comprising program code that is executable by a processing device for causing the processing device to:
receive a definition and an assigned value for at least one global variable specifying an aesthetic for an on-line document;
receive a definition of at least one component variable associated with an aesthetic property of a component of the on-line document, the at least one component variable defined to acquire a globally specified value;
receive the globally specified value;
receive a default value for the at least one component variable;
store the definition of the at least one global variable and the definition of the at least one component variable in an aesthetic descriptor file for the component of the on-line document, the aesthetic descriptor file configured to refer to the assigned value and the globally specified value when rendering the on-line document; and
store the default value in the aesthetic descriptor file for the component of the on-line document so that the at least one component variable is definable independently of an availability of the globally specified value.

14. The non-transitory computer-readable medium of claim 13 further comprising program code that is executable by the processing device for causing the processing device to render the on-line document by referring to the aesthetic descriptor file including the assigned value for the at least one global variable and the globally specified value for the at least one component variable.

15. The non-transitory computer-readable medium of claim 14 further comprising program code that is executable by the processing device for causing the processing device to:
receive a new globally specified value; and render the on-line document so that all of the components with component variables that have the globally specified value reflect the new globally specified value.

16. The non-transitory computer-readable medium of claim 14 further comprising program code that is executable by the processing device for causing the processing device to render the on-line document using the default value for the at least one component variable when the globally specified value is unavailable.

17. The non-transitory computer-readable medium of claim 14 further comprising program code that is executable by the processing device for causing the processing device to:
   send the on-line document to a client device in response to a request from the client device; and
   render the on-line document in a web browser of the client device by referring to the aesthetic descriptor file, the assigned value for the at least one global variable and the globally specified value for the at least one component variable.

18. The non-transitory computer-readable medium of claim 13 wherein the globally specified value for the at least one component variable is the assigned value for the at least one global variable.

\* \* \* \* \*